US 7,558,744 B2

(12) United States Patent
Razumov

(10) Patent No.: US 7,558,744 B2
(45) Date of Patent: Jul. 7, 2009

(54) MULTIMEDIA TERMINAL FOR PRODUCT ORDERING

(76) Inventor: Sergey N. Razumov, Electricheskiy Pereulok, dom 8, korpus 4, kvartira 7, Moscow (RU)

( * ) Notice: Subject to any disclaimer, the term of this patent is extended or adjusted under 35 U.S.C. 154(b) by 907 days.

(21) Appl. No.: 10/762,375

(22) Filed: Jan. 23, 2004

(65) Prior Publication Data

US 2005/0165663 A1 Jul. 28, 2005

(51) Int. Cl.
 *G06Q 30/00* (2006.01)
(52) U.S. Cl. ....................................................... 705/26
(58) Field of Classification Search ................... 705/26, 705/27; 704/235, 270
 See application file for complete search history.

(56) References Cited

U.S. PATENT DOCUMENTS

| 4,073,368 | A | | 2/1978 | Mustapick | |
|---|---|---|---|---|---|
| 5,845,263 | A | * | 12/1998 | Camaisa et al. | 705/27 |
| 6,681,207 | B2 | * | 1/2004 | Garudadri | 704/256 |
| 2002/0072974 | A1 | * | 6/2002 | Pugliese et al. | 705/14 |
| 2002/0143655 | A1 | * | 10/2002 | Elston et al. | 705/26 |
| 2003/0046166 | A1 | * | 3/2003 | Liebman | 705/15 |
| 2003/0075600 | A1 | * | 4/2003 | Struthers et al. | 235/381 |
| 2004/0030596 | A1 | * | 2/2004 | Attar et al. | 705/14 |
| 2004/0122731 | A1 | * | 6/2004 | Mannik et al. | 705/14 |
| 2004/0143512 | A1 | * | 7/2004 | Sturr, Jr. | 705/26 |
| 2004/0158499 | A1 | * | 8/2004 | Dev et al. | 705/26 |
| 2004/0176963 | A1 | * | 9/2004 | Vallerand | 705/1 |
| 2004/0210492 | A1 | * | 10/2004 | Husain et al. | 705/27 |
| 2004/0249724 | A1 | * | 12/2004 | Gosewehr | 705/26 |

FOREIGN PATENT DOCUMENTS

| JP | 06149534 | A | * | 5/1994 |
|---|---|---|---|---|
| JP | 2002-312451 | A | | 10/2002 |

OTHER PUBLICATIONS

Business editors, "ShopTalk Introduces First Voice Commerce Platform For 'Shopping Anywhere, Anytime,'" Business Wire, New York, Sep. 6, 2000, p. 1.*
U.S. Appl. No. 09/745,420.
U.S. Appl. No. 10/354,025.

* cited by examiner

*Primary Examiner*—Jeffrey A Smith
*Assistant Examiner*—Amee A Shah
(74) *Attorney, Agent, or Firm*—McDermott Will & Emery LLP

(57) ABSTRACT

A novel multimedia system for enabling a customer to order a required product in a retail system. The multimedia system has a voice recognition mechanism for recognizing a voice input, and a display mechanism responsive to the recognized voice input for displaying images assisting the customer in ordering the product during a product ordering session. The voice recognition mechanism and the display mechanism may be elements of a product ordering terminal in a retail facility.

15 Claims, 4 Drawing Sheets

MULTIMEDIA TERMINAL FOR PRODUCT ORDERING

RELATED APPLICATIONS

The present application is related to my U.S. patent application No. 09/745,420 filed on Dec. 26, 2000, entitled "RETAIL SYSTEM WITH PURCHASE ORDERING" and incorporated herewith by reference, and to my U.S. patent application No. 10/354,025 filed on Jan. 30, 2003 entitled "GRAPHICAL USER INTERFACE FOR PRODUCT ORDERING IN RETAIL SYSTEM" and incorporated herewith by reference.

FIELD OF THE INVENTION

This application relates to retail systems, and more particularly, to a multimedia terminal for enabling a customer of a retail system to place an order for a product.

BACKGROUND OF THE INVENTION

It is well known that the most expensive place to hold merchandise is on the shelf of a retail store because of all resources it consumes until that point, such as labor, transportation, and storage costs. In addition, consumer study conducted by Anderson Consulting (now Accenture) and the Food Marketing Institute (FMI) showed that of the products consumers want in a grocery store, 6% to 8% are out-of-stock. For promotional items, this number jumps to 25% out-of-stock products. The study concluded that the out-of-stock levels add up to about $100 billion in lost sales for retailers.

Therefore, there is a need for retail mechanisms that would enable retailers to meet customers' demands without having to hold merchandise on the shelves. For example, a retail system disclosed in my copending U.S. patent application No. 09/745,420 filed on Dec. 26, 2000, entitled "RETAIL SYSTEM WITH PURCHASE ORDERING" and incorporated herewith by reference, employs a purchase ordering mechanism in a retail system controlled by a control system and comprising at least one storage facility for storing goods available for sale in the retail system, and multiple points of sale. Each point of sale enables a customer to obtain an ordered purchase after a time period sufficient to deliver the ordered purchase from the storage facility to the point of sale. To order the purchase, the customer may use a computer terminal remote with respect to the purchase obtaining points, or a computer terminal installed at one of the purchase obtaining points. Alternatively, a purchase may be ordered via a telephone system.

A purchase ordering terminal, disclosed in my copending application No. 10/354,025 filed on Jan. 30, 2003 entitled "GRAPHICAL USER INTERFACE FOR PRODUCT ORDERING IN RETAIL SYSTEM" and incorporated herewith by reference, is a touch screen computer having a touch sensitive screen. The user interfaces with the computer by appropriately touching areas of the display screen with the finger to execute commands, enter data, respond to prompts, etc. In response to the user's inputs, the terminal displays multiple screens enabling the user to select a point of sale, delivery time, and collect required products in a "basket" or "shopping card".

To facilitate a product ordering procedure, it would be desirable to provide interactions between user's voice commands and images displayed on the screen during a product ordering session. Therefore, it would be desirable to create a multimedia product ordering terminal utilizing voice and image data for enabling the user to order required products.

SUMMARY OF THE INVENTION

The present application provides a novel multimedia system for enabling a customer to order a required product in a retail system. The multimedia system includes a voice recognition mechanism for recognizing a voice input, and a display mechanism responsive to the recognized voice input for displaying images assisting the customer in ordering the product during a product ordering session. For example, the voice recognition mechanism and the display mechanism may be elements of a product ordering terminal in a retail facility.

In accordance with one aspect of the invention, the customer is enabled to control an image displayed by the display mechanism either by touching a control element displayed on the screen or by a voice command corresponding to a function of the control element.

In accordance with another aspect of the invention, the display mechanism displays various screens representing different phases of the product ordering session. In response to the recognized customer's voice input, the display mechanism may replace one display screen with another.

In accordance with a further aspect of the invention, a unique set of voice commands recognizable by the voice recognition mechanism corresponds to every screen displayed by the display mechanism. Graphical elements indicating voice commands available in a particular phase of the product ordering session may be displayed on the respective screen.

In accordance with another aspect of the invention, in addition to general voice commands, voice commands recognizable by the voice recognition mechanism during the product ordering session include point-of-sale keywords for defining points of sales for delivery an ordered product, and product keywords for defining products available for ordering.

In accordance with a further aspect of the invention, a voice recording mechanism may be provided in the product ordering terminal for recording the voice input to accumulate voice information for testing and adjusting the voice recognition mechanism.

In accordance with a method of the invention, the following steps are carried out to order a product:
  recognizing a voice input from a customer, and
  in response to the recognized voice input, displaying images assisting the customer in ordering the product during a product ordering session.

Still other aspects, objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and entities are shown in block diagram form in order to avoid unnecessarily obscuring the present invention.

Figure 1:
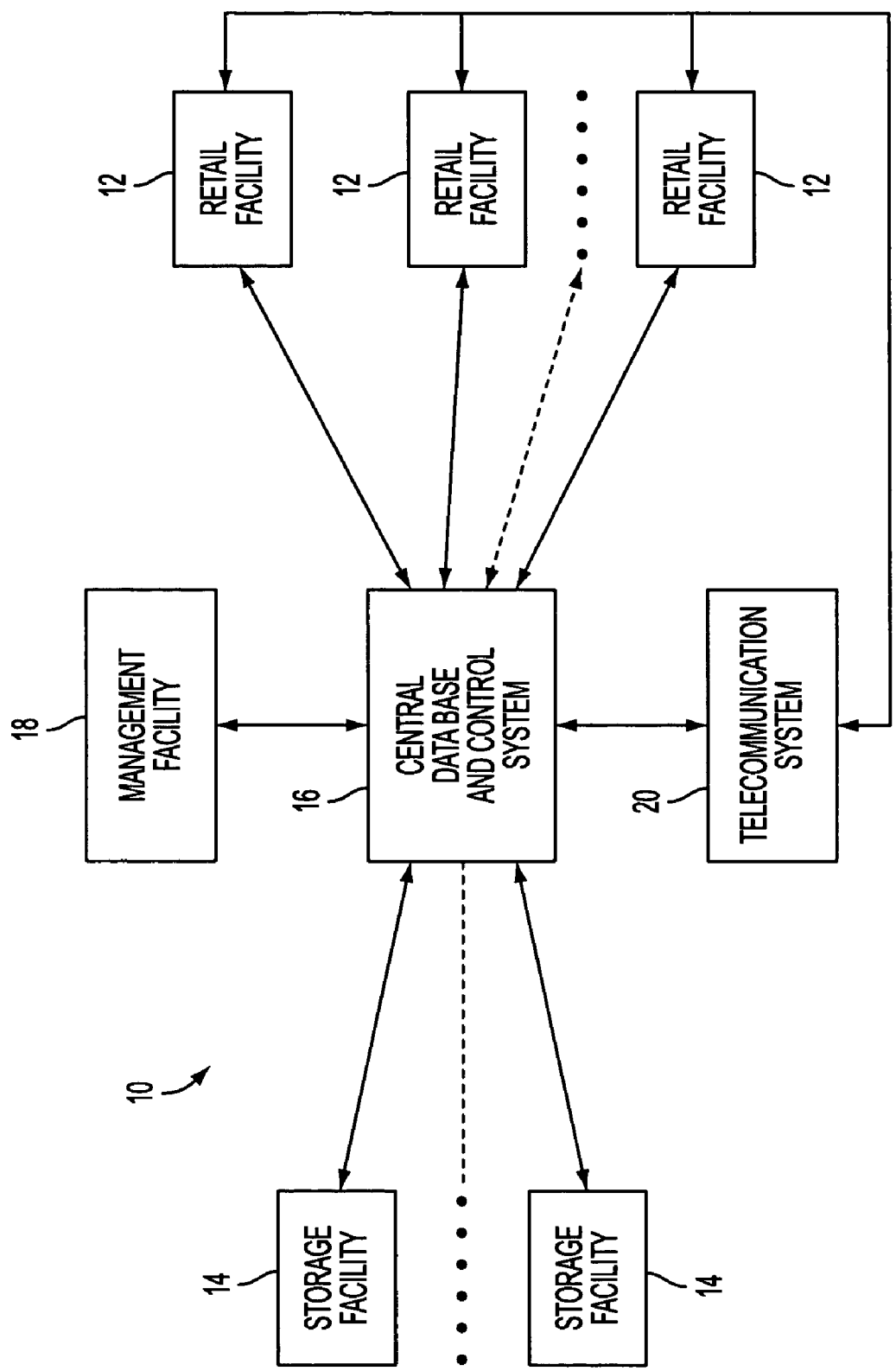
FIG. 1 is a block diagram illustrating the retail system in which the multimedia product ordering terminal of the present invention may be utilized.

FIG. 1 illustrates an exemplary retail system 10, in which a purchase ordering system of the present invention may be implemented. The retail system 10 may comprise a plurality of retail facilities 12 for enabling customers to order and/or receive purchases, a plurality of storage facilities 14, a central data base and control system 16, a management facility 18, and a telecommunications system 20, such as an Internet-based communications network. For example, the retail system 10 of the present invention may sell such items as food products, consumer goods, video/audio products, etc. A delivery system may be provided to enable delivery of goods to the storage facilities 14, and from the storage facilities 14 to the retail facilities 12 or to other purchase obtaining points such as a customer's place of residence or business.

Each retail facility 12 may contain at least one purchase ordering terminal for enabling customers to order products available in the retail system 10. Also, the purchase ordering terminals may be installed in various points of ordering arranged conveniently for customers, for example, at community centers, office buildings, industrial facilities, post offices, parking lots, etc.

In accordance with an embodiment of the present invention, the purchase ordering terminal may be a multimedia terminal responsive to customers' voice commands for producing images that enable customers to order products. As discussed in more detail later, a customer may interface with the multimedia purchase ordering terminal by producing voice signals to execute commands, enter data, respond to prompts, etc. Alternatively, the customer may interface with the terminal by touching appropriate areas of the touch-screen display device with the finger.

Also, the retail system 10 enables users to place an order using their personal computers, such as desktop and laptop computers, or other personal digital devices, such as personal digital assistants or cell phones. The computers or other digital devices may be equipped with a voice recognition system to enable product ordering using voice commands. Moreover, to facilitate the ordering process, the customer may be provided with a data storage device, such as a CD-ROM or DVD device, which contains information on items available in the retail system 10. At the beginning of a purchase ordering session, the telecommunications system 20 may connect the customer's data storage device to the central data base and control system 16 to update the information stored by the data storage device.

Figure 2:
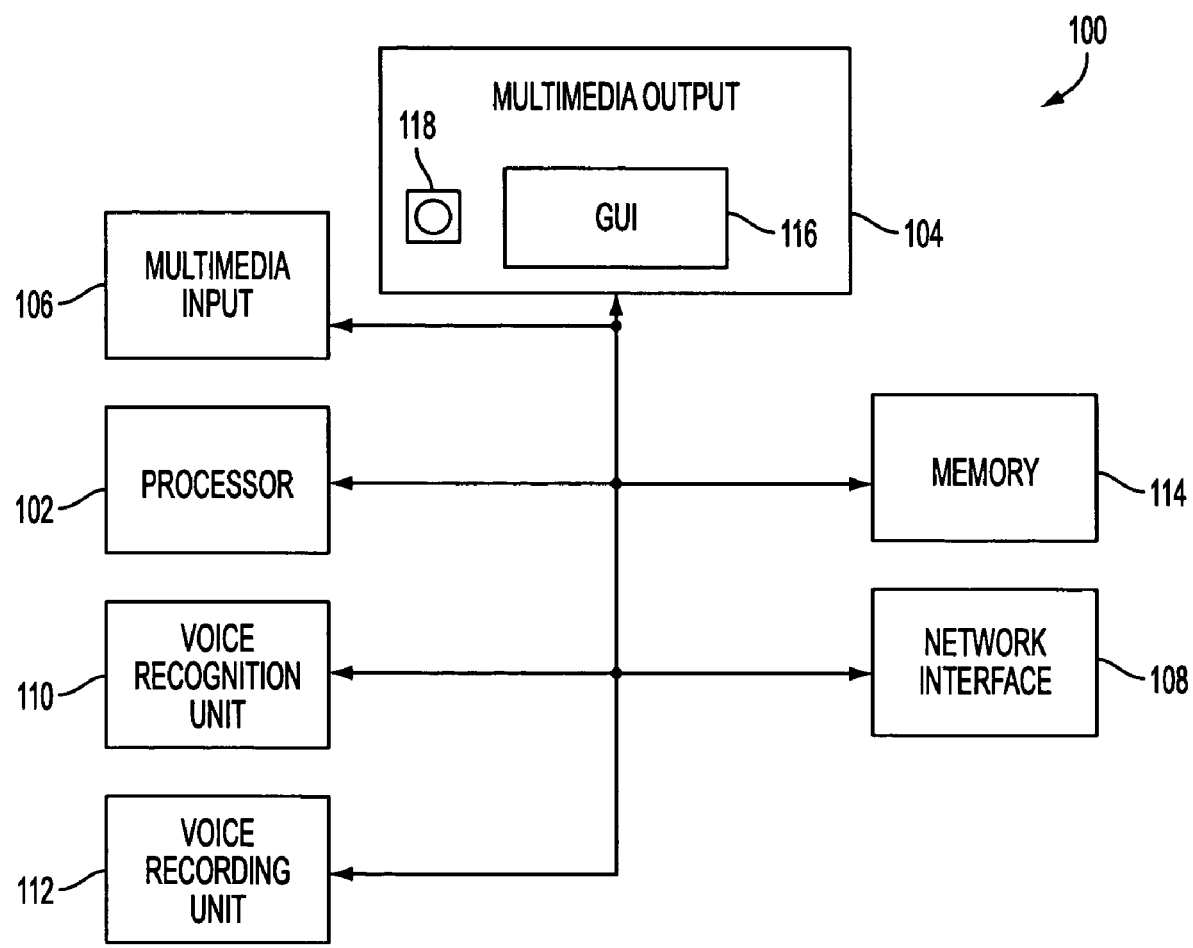
FIG. 2 is a block diagram illustrating a simplified arrangement of the multimedia product ordering terminal of the present invention.

Although a multimedia terminal of the present invention is presented with an example of a product ordering terminal at the retail facility 12 or another ordering point of the retail system 10, one skilled in the art would recognize that the present invention may be implemented using a customer's personal computer or other digital device. As shown in FIG. 2, a multimedia purchase ordering terminal 100 of the present invention may include a processor 102, multimedia output devices 104, multimedia input devices 106, network interface and data communications devices 108, a voice recognition unit 110, a voice recording unit 112, and a memory 114 coupled to the processor for storing various data and sequences of instructions executed by the processor 102 to provide operations of the multimedia terminal 100.

The multimedia output devices 104 may include, without limitation, monitors 116 for presenting text and images, and voice output devices 118 such as speakers, earphones and headphones. In accordance with an embodiment of the present invention, the monitor may display a graphical user interface (GUI) for enabling a user to order products in the retail system 10. An example of such a GUI is presented in my copending U.S. patent application No. 10/354,025 filed on Jan. 30, 2003 entitled "GRAPHICAL USER INTERFACE FOR PRODUCT ORDERING IN RETAIL SYSTEM" and incorporated herewith by reference. The multimedia input devices 106 may include, without limitation, a voice input device such as a microphone, a touch screen device, a keyboard, and a pointing devices such as an electronic mouse, trackball, light pen, thumb wheel, digitizing tablet, touch sensitive pad.

The memory 40 may store a number of items including programs for performing product ordering procedures and a runtime environment. The runtime environment typically is an operating system which manages computer resources required for embodiments of the present invention to operate. The runtime environment may also be a microkernel, a message passing system, a dynamic loadable linkable module, a browser application for the World Wide Web, a runtime interpreter environment, or any other system which manages computer resources.

As discussed in more detail later, the voice recognition unit 110 may be implemented using voice recognition software that provides entering and recognizing a large number of voice commands in real time. For example, more than 500 voice commands may be used in the product ordering procedure of the present invention. The voice recording unit 112 may provide recording voice signals into a voice database of the retail system 100, in order to test and adjust the voice recognition unit 110. Also, the voice recording unit 12 may support collecting personal voice models representing customers of the retail system 10 to customize voice recognition of individual customers.

The multimedia input devices 106 enable a customer to interact with the multimedia purchase ordering terminal 100 using voice commands and signals received by a microphone, or alternatively, by touching appropriate areas of the touch-screen display device with the finger. For example, the monitor 116 may display buttons graphically presenting users' commands available in a particular phase of the product ordering procedure. In accordance with one aspect of the invention, the commands displayed on the monitor 116 in a particular phase of the product ordering procedure may be similar to voice commands available for the customer in that phase.

Alternatively, the voice commands may complement the commands displayed on the monitor 116 to enable the customer to operate in a freewheeling mode, which is not limited by a pre-set product ordering procedure. The freewheeling mode of operation allows the customer to modify a screen displayed by the monitor 116 in any desired manner. The voice command may cause the monitor 116 to switch between screens representing non-sequential phases of a product ordering session. For example, in response to a voice command identifying a desired product or a desired category, the customer is enabled to switch from any phase of the product ordering session to a screen presenting a desired product or a desired category of products.

The voice command may be associated with the image displayed by the monitor 116 to request the monitor 116 to display a screen linked to that image. For example, when a particular product is displayed, the voice command may request the monitor 116 to display information about the product, or to display a similar product with different characteristics, such as a product, which is less expensive that the displayed product, or a product containing less fat that the displayed product. Hence, voice commands complement displayed images to facilitate product ordering.

Via the telecommunication system 20, information on purchase orders made by customers using the multimedia purchase ordering terminals, or their personal computers or other digital devices is transferred to the central data base and control system 16 for arranging purchase delivery from the respective storage facility 14 to the retail facility 12 selected by the customer, or other purchase obtaining point.

In accordance with an embodiment of the invention, voice commands available for customers during the product ordering procedure include general voice commands and voice keywords. The general voice commands define requested operations to be performed by the multimedia product ordering terminal 100. As discussed in more detail later, a unique set of general voice commands may be defined for each screen displayed by the monitor 116 to present a particular phase of the product ordering procedure.

For example, the general voice commands include such commands as "Help", "Return", "Basket", "Order", etc. In response to the customer's voice command "Help", the monitor 116 displays a message assisting the customer in the respective phase of the product ordering procedure. In response to the voice command "Return", the monitor 116 returns to displaying the screen previously displayed. The voice command "Basket" causes the monitor 116 to display an electronic "basket" or "shopping card" containing products selected by the customer. The voice command "Order" results in displaying a screen enabling the customer to finalize her order.

The general voice commands are recognized by the voice recognition unit 110 using a set of recognizable words established for each general voice command. For example, the voice command "Help" may be recognized by the voice recognition unit 110 when a customer says the word "help", "assist", "prompt" or "question." The voice command "Basket" may be recognized when the customer says the word "basket", "card" or "shopping card". The voice command "Return" may be issued when the voice recognition unit 110 recognizes the words "return" or "back."

The voice keywords include product keywords that define products or category of products available in the retail system 10 and point-of-sale (POS) keywords that define points of sales available in the retail system 10. Each product or a category of products is defined by a set of product keywords identifying and describing the respective product or category. For example, a particular product may be described by the product keywords identifying a type of the product, manufacturer, price, weight, a type of package, etc.

Each POS is defined by a set of POS keywords identifying and describing the respective POS. For example, a POS may be described by POS keywords identifying location of the POS, such as the name of a region, a street address, a metro station, etc. While the general voice commands may be set permanently during an initial set up of the multimedia terminal 100, the voice keywords may be updated and modified in accordance with changes in product nomenclature and POS availability. The general voice commands, as well as the voice keywords may be stored in a voice database accessible by the voice recognition unit 110.

Figure 3:
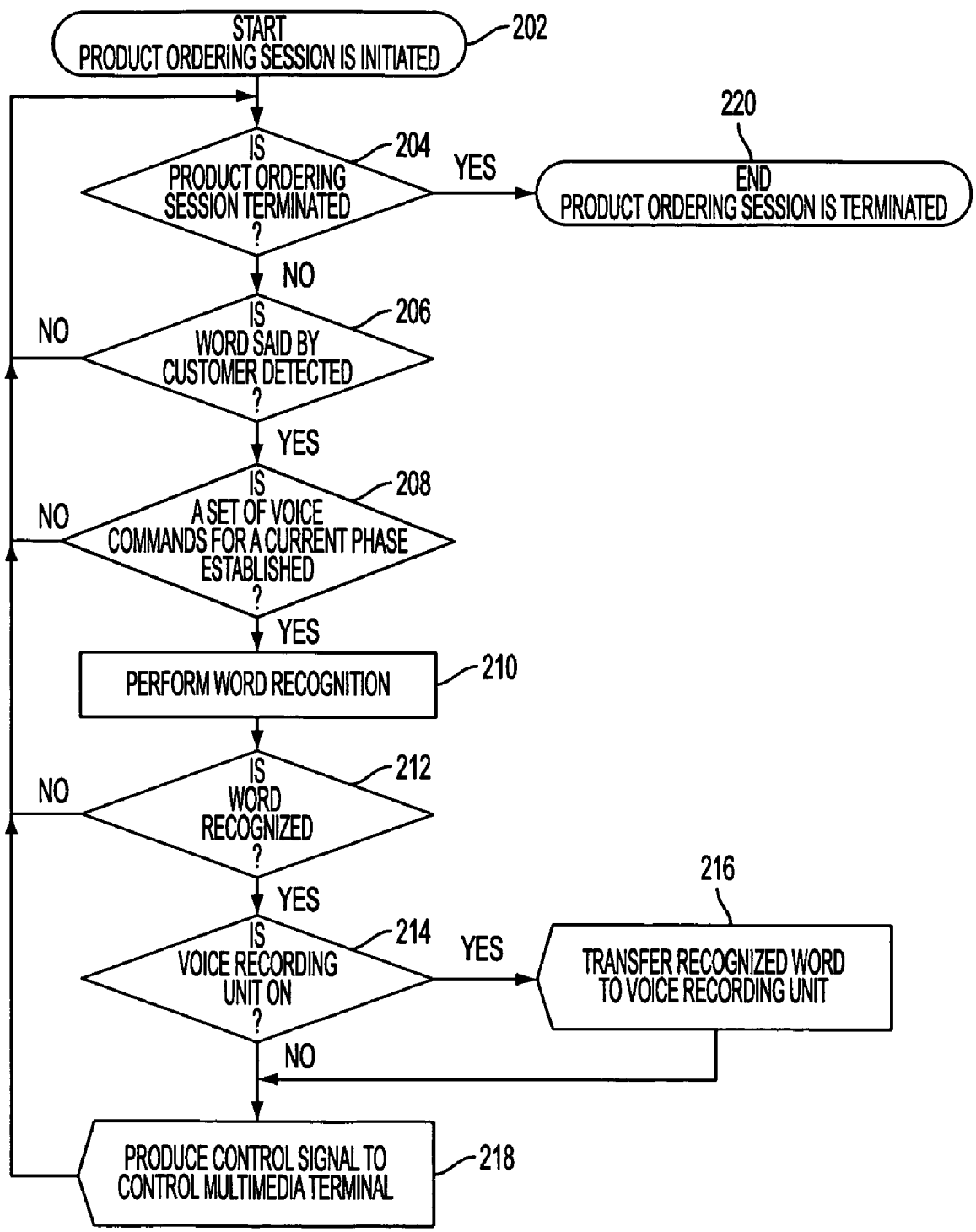
FIG. 3 is a flow chart illustrating operations of the voice recognition unit of the present invention.

During a product ordering session with a customer, the voice recognition unit 110 interacts with the monitor 116 by generating a control signal that controls the monitor 116 in accordance with a voice command received from the customer. As illustrated in FIG. 3, the voice recognition unit 110 is activated, when the customer initiates a product ordering session (block 202). For example, the customer may initiate the product ordering session by activating the multimedia terminal 100 using a customer's shopping card or other ID card.

The voice recognition unit 110 monitors whether the current product ordering session is not finished (block 204). If the session is not finished, the voice recognition unit 110 determines whether a word was said by the customer (block 206). A microphone may be used for detecting words said by customers.

If a word is detected, the voice recognition unit 110 determines whether or not a set of voice commands is established for a current phase of the product ordering session (block 208). A unique set of voice commands is established for each phase of the product ordering procedure. For example, during a POS selection phase, when the monitor 116 displays a POS selection screen enabling the customer to select a POS, to which the ordered purchase should be delivered, a set of voice commands may include POS keywords, and general voice commands relating to the POS selection such as "Zoom-In" and "Zoom-Out" to modify the scale of a map showing available points of sales. During a delivery time selection phase, when the monitor 116 displays a delivery time selection screen enabling the customer to select a time for delivery the ordered purchase to the selected POS, a set of voice commands may include such voice commands as "Today", "Tomorrow", "Morning", "Afternoon", etc. that identify a time of delivery requested by the customer.

By restricting the number of recognizable voice commands in a particular phase of the product ordering session to a limited set of voice commands, the voice recognition unit 110 substantially improves voice recognition. In addition, a limited set of voice commands available in a current phase of a product ordering session may be displayed by the monitor 116 during the respective phase to facilitate product ordering operations. For example, during a POS selection phase, the monitor 116 displays the POS selection screen that may contain a list of available points of sale. Each POS in the list may be identified in accordance with available POS keywords. Further, the POS selection screen may display a map showing available points of sales and buttons "Zoom-In" and "Zoom-Out" for modifying the scale of this map. To operate the multimedia terminal 100 in the POS selection phase, the customer may either say a voice command of a set of available voice commands, or touch the appropriate button or point on the screen. Similarly, the delivery time selection screen displayed in the delivery time selection phase of the product ordering session may contain buttons "Today", "Tomorrow", "Morning", "Afternoon", etc. to indicate available voice commands and enable the customer to operate the multimedia terminal either by voice commands or by touching appropriate buttons displayed on the screen.

If a set of voice commands for the current phase of the product ordering session is established, the voice recognition unit 110 performs a word recognition procedure to identify the word said by the customer as a voice command of the set of voice commands available in the current phase (block 210).

The voice recognition unit 110 does not respond to a word, which is not included in a set of voice commands for the current phase. For example, in the POS selection phase, the voice recognition unit 110 may not respond to a product keyword.

If the word is recognized (block 212), the voice recognition unit 110 determines whether the voice recording unit 112 is on (block 214). By default, the voice recording unit 112 is off. It may be activated for recording voice signals into the voice database to accumulate voice information for testing and adjusting the voice recognition unit. If the voice recording unit 112 is on, the voice recognition unit 110 transfers the recognized word to the voice recording unit 112 for recording into the voice database (block 216).

After the customer's word is recognized, the voice recognition unit 110 produces a control signal to control the multimedia terminal 100 in accordance with the recognized voice command (block 218). Then, the voice recognition unit 110 repeats operations 204-218 to recognize the next word said by the customer. The voice recognition procedure continues until a product ordering session with a particular customer is terminated (block 220).

As discussed above, the product ordering session enables the customer to select a point of sale for delivery the ordered purchase and a delivery time. Thereafter, the multimedia terminal 100 enables the customer to select required products and place an order for the selected products. In particular, the product ordering session may include a category selection phase, during which the monitor 116 displays a screen containing various categories of available products to enable the customer to select a required category. Then, a product selection phase may be carried out, during which the monitor 116 displays a screen showing a group of products in the selected category to enable the customer to select a required product. Also, the product ordering session may include a product review phase, during which the monitor 116 displays a product review screen showing detailed information on the selected product. In a basket content review phase, the monitor 116 displays a basket content screen enabling the customer to review content of her basket or shopping card, and add and/or remove some items. In an order review phase, the monitor 116 displays a screen that enable the customer to review and edit her purchase order.

Figure 4:
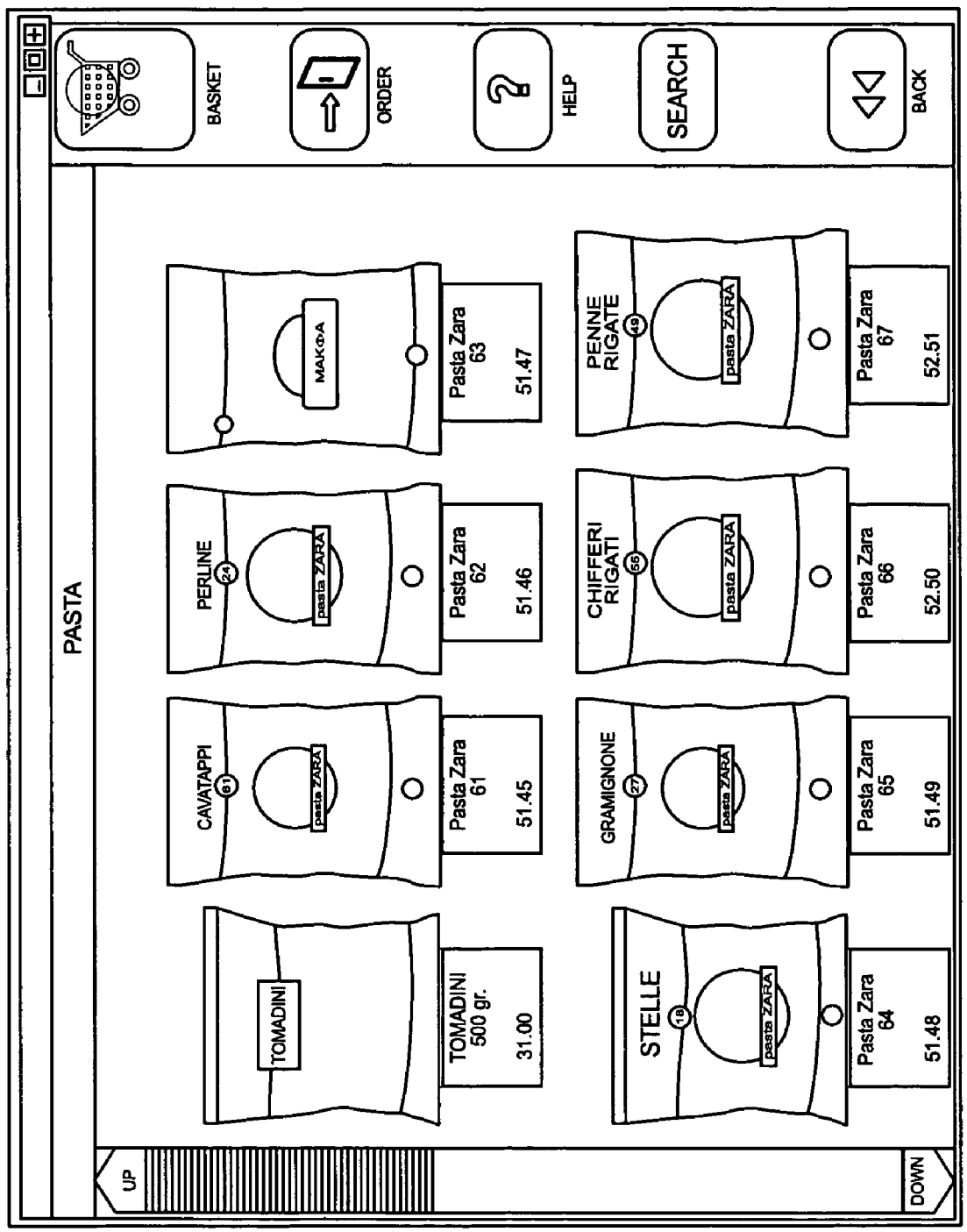
FIG. 4 is a diagram illustrating an exemplary screen displayed by the monitor during a product ordering session.

During every phase of the product ordering session, the monitor 116 may display buttons labeled in accordance with voice commands available in the respective phase. For example, FIG. 4 illustrates a product selection phase, when the monitor 116 displays a product selection screen enabling the customer to select a product among multiple products of a particular type or category. The screen may show a virtual supermarket stand containing multiple horizontal shelves stacked with products of the selected group, for example, with different pasta products. The product selection screen contains various operational buttons labeled in accordance with voice commands available in the product selection phase of the product ordering session.

For example, the operational buttons include button corresponding to voice command "BASKET". In response to this voice command, the monitor 116 displays a basket content screen that shows items currently contained in the customer's basket or shopping card. Alternatively, the customer may touch or select the button "BASKET" to move to the basket content screen.

The operational buttons on the product selection screen may include button corresponding to voice command "ORDER". In response to this command, an order may be placed based on items currently contained in the basket. Alternatively, the customer may place an order by touching or selecting the button "ORDER". Further, among the operational buttons on the product selection screen may be button corresponding to voice command "HELP" to enable customers to get information on various aspects of the purchase ordering process, and button corresponding to voice command "BACK" to enable customers to return to a previous screen.

Voice command "SEARCH" may be available during the product selection phase to switch to a product search screen enabling a customer to search for a required product. Corresponding button may be displayed on the product selection screen. Alternatively, search for a product may be performed when the voice recognition unit 110 recognizes a product keyword relating to the requested product.

Each of the displayed shelves on the product selection screen contains selectable elements in a form of product images, and selectable elements in a form of price tags or price labels adjacent respective product's images. Each displayed price tag or price label attached to the displayed product identifies the respective product and shows its price. When a customer touches or selects the price tag attached to a product on the virtual shelf, the product is placed into the customer's virtual basket or shopping card. If the customer touches or selects the image of the product, a product review screen is displayed to show an enlarged image of the product and information relevant to that product.

Hence, the multimedia product ordering terminal 100 of the present invention provides interaction between voice commands and images displayed on the monitor to facilitate a product ordering process. A screen displayed by the monitor in the respective phase of the product ordering session is associated with a particular set of voice commands available during the respective phase. Moreover, images on the screen may point out the available voice commands to customers to guide them through a product ordering session. Voice commands complement displayed images to facilitate product ordering. In particular, the monitor may display a screen linked to a displayed image in response to the voice command associated with that displayed image. Further, a voice command may request the monitor to display a screen which is not available by selecting a button displayed by the monitor.

Those skilled in the art will recognize that the present invention admits of a number of modifications, within the spirit and scope of the inventive concepts, and that it may be applied in numerous applications, only some of which have been described herein. It is intended by the following claims to claim all such modifications and variations which fall within the true scope of the invention.

What is claimed is:

1. A system for enabling a customer to order a required product, comprising:
    a voice recognition mechanism for recognizing voice commands from the customer, and
    a display mechanism responsive to the recognized voice commands for displaying images assisting the customer in ordering the product during a product ordering session,
    the display mechanism being configured for displaying a first screen representing a first phase of the product ordering session and a second screen representing a second phase of the product ordering session, and
    the voice recognition mechanism being configured to establish a first set of voice commands recognizable when the first screen is displayed, and a second set of voice commands recognizable when the second screen is displayed.

2. The system of claim 1, wherein the first set of voice commands differs from the second set of voice commands.

3. The system of claim 1, wherein the voice recognition mechanism is configured to recognize only voice commands of the first set when the first screen is displayed, and to recognize only voice commands of the second set when the second screen is displayed.

4. The system of claim 1, wherein the display mechanism is configured to display a first set of images corresponding to the first set of voice commands when the first screen is displayed, and to display a second set of images corresponding to the second set of voice commands when the second screen is displayed.

5. The system of claim 4, wherein the display mechanism is configured to perform a predetermined operation in response to a voice command recognized by the voice recognition mechanism, and to perform the same predetermined operation in response to selection of a displayed image corresponding to the recognized voice command.

6. The system of claim 1, wherein the display mechanism is responsive to a recognized voice command to replace the first screen with the second screen, where the first and second screens represent non-consecutive phases of the product ordering session.

7. The system of claim 1, wherein the voice recognition mechanism and the display mechanism are elements of a product ordering terminal in a retail facility.

8. A system for enabling a customer to order a required product, comprising:
   a voice recognition mechanism for recognizing voice commands from the customer, and
   a display mechanism responsive to the recognized voice commands for displaying images assisting the customer in ordering the product during a product ordering session,
   the voice recognition mechanism being configured to establish a first set of voice commands recognizable during a first phase of the product ordering session, and a second set of voice commands recognizable during a second phase of the product ordering session, and
   the display mechanism being configured for displaying a first set of images representing the first set of voice commands during the first phase of the product ordering session, and for displaying a second set of images representing the second set of voice commands during the second phase of the product ordering session.

9. The system of claim 8, wherein the first set of voice commands differs from the second set of voice commands.

10. The system of claim 8, wherein the voice recognition mechanism is configured to recognize only voice commands of the first set during the first phase of the product ordering session, and to recognize only voice commands of the second set during the second phase of the product ordering session.

11. The system of claim 8, wherein the display mechanism is configured to perform a predetermined operation in response to a voice command recognized by the voice recognition mechanism, and to perform the same predetermined operation in response to selection of a displayed image corresponding to the recognized voice command.

12. A method of ordering a product using a terminal supplied with voice commands from a customer, the method comprising the steps of:
    establishing a first set of voice commands executed by the terminal during a first phase of a product ordering session,
    establishing a second set of voice commands executed by the terminal during a second phase of the product ordering session,
    displaying a first set of images corresponding to the first set of voice commands during the first phase of the product ordering session, and
    displaying a second set of images corresponding to the second set of voice commands during the second phase of the product ordering session.

13. The method of claim 12, wherein the first set of voice commands differs from the second set of voice commands.

14. The method of claim 12, wherein only voice commands of the first set are executed during the first phase of the product ordering session, and only voice commands of the second set are executed during the second phase of the product ordering session.

15. The method of claim 12, wherein a predetermined operation is performed in response to a voice command of the supplied voice commands, and the same predetermined operation is performed in response to selection of a displayed image corresponding to the voice command.

* * * * *